(12) United States Patent
Goettfert et al.

(10) Patent No.: US 9,356,622 B2
(45) Date of Patent: May 31, 2016

(54) APPARATUS AND METHOD FOR RECONSTRUCTING A BIT SEQUENCE WITH PRELIMINARY CORRECTION

(71) Applicant: Infineon Technologies AG, Neubiberg (DE)

(72) Inventors: Rainer Goettfert, Putzbrunn (DE); Gerd Dirscherl, Munich (DE); Berndt Gammel, Markt-Schwaben (DE); Thomas Kuenemund, Munich (DE)

(73) Assignee: Infineon Technologies AG, Neubiberg (DE)

( * ) Notice: Subject to any disclaimer, the term of this patent is extended or adjusted under 35 U.S.C. 154(b) by 145 days.

(21) Appl. No.: 13/803,324

(22) Filed: Mar. 14, 2013

(65) Prior Publication Data

US 2013/0246881 A1    Sep. 19, 2013

(30) Foreign Application Priority Data

Mar. 16, 2012 (DE) .......................... 10 2012 102 254

(51) Int. Cl.
| | |
|---|---|
| *H03M 13/03* | (2006.01) |
| *H03M 13/00* | (2006.01) |
| *H04L 1/00* | (2006.01) |
| *H03M 13/37* | (2006.01) |
| *H04L 9/08* | (2006.01) |
| *H04L 9/32* | (2006.01) |

(52) U.S. Cl.
CPC .............. *H03M 13/00* (2013.01); *H03M 13/03* (2013.01); *H03M 13/3707* (2013.01); *H04L 1/0045* (2013.01); *H04L 9/0866* (2013.01); *H04L 9/3278* (2013.01); *H04L 2209/34* (2013.01)

(58) Field of Classification Search
CPC ... H04L 9/0866; H04L 9/3278; H04L 1/0057; H04L 1/004; H04L 1/0045; H04L 2209/34; G06F 11/07; G06F 11/08; G06F 11/10; H03M 13/03; H03M 13/13; H03M 13/35; H03M 13/3707; H03M 13/3715
USPC .......... 714/799, 746, 752, 774; 713/168, 189, 713/193, 194; 380/255
See application file for complete search history.

(56) References Cited

U.S. PATENT DOCUMENTS

| | | | | |
|---|---|---|---|---|
| 2008/0112596 A1* | 5/2008 | Rhoads et al. | ................ | 382/115 |
| 2008/0222491 A1* | 9/2008 | Lee et al. | ...................... | 714/763 |
| 2009/0327747 A1* | 12/2009 | Bruekers et al. | .............. | 713/189 |

(Continued)

FOREIGN PATENT DOCUMENTS

| | | |
|---|---|---|
| CN | 102077205 A | 5/2011 |
| WO | 2006129242 A2 | 12/2006 |
| WO | 2010100015 A1 | 9/2010 |

*Primary Examiner* — Albert Decady
*Assistant Examiner* — Christian Dorman
(74) *Attorney, Agent, or Firm* — Murphy, Bilak & Homiller, PLLC

(57) ABSTRACT

A method for reconstructing a physically uncloneable function (PUF) A for use in an electronic device is provided. The method includes generating a potentially erroneous PUF $A_t$ and performing a preliminary correction of the potentially erroneous PUF $A_t$ by means of a stored correction vector $Delta_{t-1}$, to obtain a preliminarily corrected PUF $B_t$. The PUF A is reconstructed from the preliminarily corrected PUF $B_t$ by means of an error correction algorithm. A corresponding apparatus is also provided.

18 Claims, 3 Drawing Sheets

(56) References Cited

U.S. PATENT DOCUMENTS

| | | | |
|---|---|---|---|
| 2011/0002461 A1* | 1/2011 | Erhart et al. | 380/44 |
| 2011/0219284 A1* | 9/2011 | Uchikawa et al. | 714/763 |
| 2012/0072737 A1* | 3/2012 | Schrijen et al. | 713/189 |
| 2013/0194886 A1* | 8/2013 | Schrijen et al. | 365/226 |

* cited by examiner

APPARATUS AND METHOD FOR RECONSTRUCTING A BIT SEQUENCE WITH PRELIMINARY CORRECTION

PRIORITY CLAIM

This application claims priority to German Patent Application No. 10 2012 102 254.2, filed on 16 Mar. 2012, the content of said German application incorporated herein by reference in its entirety.

TECHNICAL FIELD

The invention is in the field of cryptography, and particularly to an apparatus and a method for reconstructing a physically uncloneable function (PUF), for example for use in an electronic chip card or an RFID device.

BACKGROUND

The abbreviation 'PUF' used herein stands for 'physically uncloneable function', also called a 'physical hash function'. The underlying concept is that of digitizing physical properties of an object and thus obtaining a bit sequence which is associated with the object. In this case, it is desirable for the bit sequences of two different physical objects to be uncorrelated with one another. A simple example for the purpose of illustration is a sheet of paper. When viewed under a microscope, it is possible to see a special fine structure of wood chips or cellulose portions. The structure is measured and is presented as a bit sequence by using a suitable algorithm. This bit sequence is then the PUF associated with the sheet of paper. Another sheet of paper will generally provide a totally different bit sequence, that is to say a bit sequence which is uncorrelated with the bit sequence of the first sheet. The terms "bit sequence" and "bit string" are used synonymously below.

The process of generating a bit sequence (the PUF) from the properties of the physical object is called PUF generation. A main use of PUFs is the production of cryptographic keys for fully electronic or computerized encryption methods. By way of example, it would be possible to use the PUF bit string itself as a cryptographic key. Alternatively, it would be possible—and has particular advantages—to compress the PUF bit string to form a shorter bit string and to use the latter as a cryptographic key. The latter method is usually used for chip cards, where a mechanism for PUF generation is integrated in the electronics of the card. In this way, the PUF generation and the use thereof for key production prevents the key itself from having to be stored on the card, which would present a security risk.

A desirable property of a PUF mechanism is that the same physical object, that is to say the same chip card, for example, results in the same bit sequence each time in the course of fresh PUF generation. This should, in particular, also be true under different ambient conditions, such as temperature, air humidity, brightness, electrical and magnetic field strengths, etc.

This is not the case in general, however. Repeated PUF generation for the same physical object generally delivers different bit sequences. Although the bit sequences are quite similar among one another, they are not absolutely identical to one another. Attempts are made to compensate for this deficit by means of methods of coding theory (error correction).

The procedure in this case is as follows. There is a physical object. At the beginning, the PUF bit sequence A associated with the object is generated. The bit string A is thus the result of the first PUF generation operation. The bit sequence A is considered in the same way as a message in coding theory which needs to be transmitted via a channel that is susceptible to noise, the transmission being expected to involve the occurrence of errors, i.e. the collapse of individual bit entries, that is to say that a zero becomes a one or vice-versa. In coding theory, this problem is countered by providing the message A with a redundancy R and transmitting the code word (A, R). If errors occur during the transmission, they can be corrected using coding theory methods owing to the redundancy R. Following correction, the error-free message word A is obtained again.

The same concept is used in PUF generation. The original PUF value A (the value arising in the first PUF generation operation) is referred to as the true PUF value. From the true PUF value A, an associated redundancy value R is calculated. R is called auxiliary information, and R is intended to be used—at a later time—to successfully reconstruct the true PUF value A.

For the sake of simplicity, it has been assumed in this case that the true PUF value A is that bit string which arises in the very first PUF generation operation. In fact, the true PUF value of a chip card is determined during production in the course of chip personalization, for example. In this case, it is customary to produce a PUF value multiple times or frequently in succession, and to define the mean value or the most frequent value as the true PUF value, for example. Another approach is to schedule a reserve. It is assumed that an 800-bit PUF value is required. However, a 1000-bit PUF value is produced (by way of example) in order to have the reserve. In the factory, the 1000-bit PUF value is then generated multiple times, for example 100 times. Each bit position which is not stable during these 100 generation operations, that is to say does not always show the same bit value, is declared invalid. It is assumed that there are 840 locations at which the same bit value occurred each time during the 100 PUF generation operations. Of these 840 locations, 800 are then selected, for example, and these 800 locations define the true PUF value.

The value R calculated using the coding algorithm is stored. For security reasons, the PUF value A itself is not stored and is therefore also not always available. The reason is that the PUF value A is used directly as a cryptographic key, or a cryptographic key is derived from it. If the PUF value A were easily accessible, it would no longer be possible to consider the associated cryptographic key as secret. During later fresh PUF generation, a new PUF value B is obtained. The value B is generally not identical to A, but differs from A only slightly. The aim is to recover the true PUF value A from the available value B.

This is accomplished by using R and methods of coding theory:

$$B \rightarrow (B,R) \rightarrow (A,R) \rightarrow A$$

The current and present PUF value B is thus extended by the auxiliary information R, with A, B and R being bit strings. The bit sequence (B,R) is then considered to be an erroneous word within the context of coding theory and the error is then corrected using coding theory. The corrected word (A,R) is obtained. In particular, the true PUF value A is now available.

The task of reconstructing the true PUF value A from the most recently generated and currently present PUF value B succeeds only if B does not differ too greatly from A. In the terminology of coding theory: if not too many errors have occurred during the generation of B, considered relative to the original true PUF value A.

The technical implementation of a PUF governs how greatly a newly generated PUF value B typically differs from the true PUF value A, that is to say how many errors typically need to be corrected. Depending on the technical implementation of the PUF, B will differ from A in fewer than 1% of the positions, for example in 0.3% or 0.6%, or in up to 25%. The more B differs from A on average, the greater and more costly the hardware implementation of the PUF reconstruction algorithm. This also means higher manufacturing costs, and greater space requirement and possibly higher power consumption.

There are several reasons for this. If the intention is to form a 128-bit secret key from the PUF value, for example, then the following parameters are obtained.

The higher the error rate (that is to say the more B differs from A), the longer the bit strings A and B must be in order to result in a secure 128-bit key at the end. If, by way of example, 15% errors occur in B in comparison with A, then A (and hence also B) must be approximately 4000 bits long in order to yield a 128-bit secret key (in the case of 25% errors, approximately 6000 bits would be needed). If only 1% errors occur, A and B would need to be approximately 600 bits long in order likewise to provide a 128-bit secret key. The values and ratios indicated above are calculated by using coding theory, and this calculation is known to a person skilled in the art and therefore does not need to be explained in more detail at this juncture. In the case of an even lower error rate and a shorter cryptographic key to be generated, it would also suffice for A and B to comprise 64 bits each, for example.

The more errors that occur, the more powerful the error correction algorithm used needs to be, and the more complex and hence expensive is the implementation thereof.

In the field of electronic chip cards, methods are usually used in which the PUF is generated by measurements on electronic circuits implemented in silicon, for example transistors. Differences in the manufacturing process for the chips, over which even the manufacturer does not have total control, are responsible for two different chips resulting in PUF strings that they have generated being uncorrelated with one another. This is used to allow different chips to automatically generate different PUFs, which is a basic prerequisite from the point of view of security.

Typically, an error rate of between 1% and 10% can be expected for such circuits. That is to say that the newly generated PUF string B will potentially differ from the true PUF string A in approximately p % of the bit locations, p being a number between 1 and 10. In line with the value p determined by experiments, the appropriate PUF string length and a requisite error correction algorithm are then implemented.

In one example, a 128-bit cryptographic key needs to be extracted from the PUF string A. If p is equal to 1, the PUF string A must then have a length of approximately 600 bits. If p is equal to 10, the PUF string A must have a length of approximately 3000 bits. Furthermore, it is true that when p is equal to 1 it is necessary or suffices to have a simpler error correction algorithm than when p is equal to 10.

As already described above, this problem is currently solved solely by means of methods of coding theory: an appropriate algebraic code is chosen, which is almost always a linear code. For the originally measured PUF bit string A, the associated redundancy value R is calculated using the chosen code. This redundancy value R is then stored—as representative of the PUF string A—in the NVM (nonvolatile memory) of the chip card. A itself is not stored, for security reasons. During fresh PUF generation at a later time, the bit string B is obtained. The redundancy value R and an algorithm from the theory of error-correcting codes (algebraic coding theory) are then used to calculate the value A from B. In other words, B is regarded as an erroneous version of A and the errors are corrected by using R and the error correction algorithm.

In this context, the redundancy R needs to be shorter than A. Since R is stored in the NVM, R is deemed to be more or less public knowledge. A cryptographic key is extracted from A. Let |A| be the bit length of A, and let |R| be the bit length of R. The difference |A|−|R| is then the length of the secret. Furthermore, only a single cryptographic key of this length can be obtained from A.

In one example, the PUF value A is assumed to have a length of 500 bits. The redundancy R is assumed to have 400 bits. It is then possible to derive a 100-bit cryptographic key from A. An obvious way of doing this is to add 5 bits from A modulo 2 each time—that is to say to XOR them—in order to obtain a key bit.

Against this background, there is a need for methods and apparatuses which allow improved PUF generation, for example more quickly or with reduced computation complexities.

SUMMARY

According to a first exemplary embodiment, a method for reconstructing a PUF A for use in an electronic device comprises generating a potentially erroneous PUF $A_t$; performing a preliminary correction of the potentially erroneous PUF $A_t$ by means of a stored correction vector $Delta_{t-1}$ in order to obtain a preliminarily corrected PUF $B_t$; and reconstructing the PUF A from the preliminarily corrected PUF $B_t$ by means of an error correction algorithm e.g. such as an ECC algorithm (algebraic coding theory).

According to a further exemplary embodiment, a corresponding apparatus comprises an element configured to generate a potentially erroneous PUF At, a memory configured to store a correction vector Deltat-1, and a first computation unit configured to perform a preliminary correction of the PUF At by means of a stored correction vector Deltat-1, to obtain a preliminarily corrected PUF Bt. The apparatus further comprises a second computation unit configured to reconstruct the PUF A from the preliminarily corrected PUF Bt by means of an error correction algorithm.

Those skilled in the art will recognize additional features and advantages upon reading the following detailed description, and upon viewing the accompanying drawings.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts. In the drawings.

DETAILED DESCRIPTION

Figure 1:
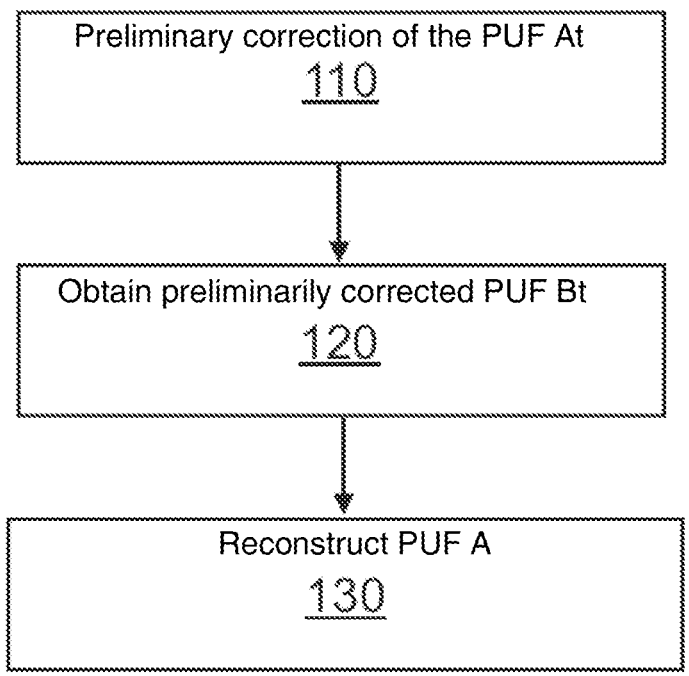
FIG. 1 schematically shows a method for reconstructing a PUF based on embodiments of the invention.

Various embodiments of the invention are described below, some of which are also shown by way of example in the figures. In the description of the figures which follows, identical reference symbols relate to identical or similar components. In general, only differences between different embodiments are described. In this context, features which are described as part of one embodiment can also readily be combined in connection with other embodiments in order to produce yet further embodiments.

As already mentioned, the reconstruction of the true PUF bit string A from the available bit string B using the redundancy R is accomplished with an error correction algorithm. There is a close relationship between the problem of PUF generation and the PUF reconstruction, on the one hand, and the problem of transmission of a message via a channel which is susceptible to noise and the correction of the received message, on the other hand.

In the case of the PUF reconstruction, the (true) PUF bit string A has originally been generated. At a later time, in the course of new PUF reconstruction, the bit string B is obtained. The aim is to reconstruct the (then) unknown A from the available B.

In the case of the message transmission, a message A is in hand, which can always also be presented as a bit string. A is sent via a channel that is susceptible to noise. A few transmission errors possibly occur. A message B is received. An error correction algorithm is then used to correct the errors which have occurred in B. As a consequence, the original message A is obtained. For the message transmission, the channel is usually assumed to be what is known as a "binary symmetric channel". This means that it is assumed that the individual message bits in A have the same probability of "flipping over", that is to say becoming an erroneous bit, independently of one another. For a binary symmetric channel with a parameter p, the following thus applies: a single observed, but arbitrary, message bit has the probability p of being converted during transmission into its complementary bit (0 becomes 1, and a 1 becomes a 0). There is the probability 1-p of the message bit being transmitted without error.

If the PUF situation is now considered, it is found—as a departure from the above consideration for the message transmission—that in this case not every bit of A has the same probability of being converted into its complementary bit in the course of new PUF generation. Instead, observations show that the individual bits in A have different probabilities of "toppling over", that is to say being converted into their respective complementary bit. As a consequence, bits in the sequence which topple over very frequently are therefore identified from the outset—that is to say during the manufacturing process for the chip in the factory—declared invalid/unusable and ignored in the future. Even among the remaining usable bits, however, it is found that they have different probabilities of toppling over. There even appear to be bits which never topple over. These are stable bits which always assume the correct value. Furthermore, there are the following two phenomena. anchor Firstly, individual usable bits (that is to say bits which originally toppled over only very rarely) alter their behavior as a consequence of an aging process such that they topple over increasingly more frequently. In the extreme case, they topple over constantly at some time, that is to say they are stable but always deliver the wrong value.

Secondly, the probability of a bit toppling over varies under the influence of ambient conditions. Above all, there are temperature dependencies in the case of silicon-based PUFs, that is to say those produced using transistor-based circuits. There are thus bits which topple over very rarely at −20 degrees Celsius, but in return topple over very frequently at +80 degrees Celsius. In this way, bits which are almost stable under one ambient condition can become very unstable under altered ambient conditions, above all when there are great differences between the old and new ambient conditions.

This means that the assumption that new PUF generation (relative to the true PUF bit string A) would behave in the same way as message transmission via a binary symmetric channel is wrong. Instead, it must be assumed that the PUF generation has a type of memory effect. The error which occurs at time t during the PUF generation is in most cases similar to the error which occurred at time t-1 during the PUF generation.

Therefore, errors which have occurred during PUF generation operations which are performed at times that are close together (under the same or at least similar ambient conditions) are not randomly independent of one another—as is the case in general for the message transmission via a channel that is described above—but instead are related to one another.

This effect is used in the method described here based on exemplary embodiments: the error which has been calculated during the PUF reconstruction at the earlier time t-1 is stored, and is used for the PUF reconstruction at the later or current time t.

This makes use of the circumstance that the PUF generation is to a certain extent dependent on ambient conditions. It is therefore generally easier to correct a PUF error that has occurred relative to a PUF value generated from the immediately preceding PUF request than relative to the very first (in the life cycle of the chip or, by way of example, the chip card) generated PUF value.

Let A be the true PUF value, that is to say the very first PUF value which was determined in the factory during manufacture of the chip.

In addition, let $A_t$ be the PUF value arising at the (later) time t. That is to say that at the time t a PUF request is made, and hence the PUF module is stimulated. As a result of the stimulation, the module outputs the current PUF value $A_t$.

In addition, let $E_t$ be the error vector. The vector $E_t$ represents the difference between the true (very first) PUF value A and the currently output PUF value $A_t$.

The following is an example of the above:

$A = (1\ 1\ 1\ 1\ 1\ 0\ 0\ 0\ 1\ 1)$;

$A_t = (1\ 0\ 1\ 1\ 1\ 0\ 0\ 0\ 1\ 1)$

In that case, $E_t = (0\ 1\ 0\ 0\ 0\ 0\ 0\ 0\ 0\ 0)$. Thus, the following is true:

$A = A_t + E_t$

As a supplement, the classical approach (not used here) to PUF reconstruction allegedly used the following procedure: following PUF stimulation, $A_t$ is obtained. An ECC error correction algorithm is used to calculate the error vector $E_t$ from $A_t$. The true PUF value A is then obtained by $A = A_t + E_t$, where the symbol or operator "+" always means the bit-by-bit XOR function.

In exemplary embodiments, the error vector $E_t$ describes the difference (the delta) between A and $A_t$. Therefore, $E_t$ is also called $Delta_t$.

The following is thus true:

$Delta_t = E_t$

In contrast to the classical approach described above, the delta correction method based on exemplary embodiments proceeds as follows. The error vector $e_{t-1} = Delta_{t-1}$, that has arisen at the time t-1 is not rejected but rather is held in a delta register, that is to say stored. When the current PUF value $A_t$ is now output by the PUF module at the time t, an attempt is not immediately made to correct $A_t$ using the ECC error correction algorithm.

Instead, the following is calculated:

$$B_t = A_t + \text{Delta}_{t-1}$$

This step is therefore a type of preliminary correction. In many cases, this preliminary correction already corrects a few bit errors in $A_t$. Therefore, the result $B_t$ is a better approximation of the true PUF value A that is sought than the bit sequence originally generated by stimulation.

$B_t$ is now subjected to the ECC error correction algorithm. This is used to calculate the error $e_t$ for $B_t$ relative to A. In general, this error $e_t$ will be smaller, that is to say contain fewer ones, than $E_t$.

The true PUF value A is then obtained from $B_t$ and $e_t$ by:

$$A = B_t + e_t$$

Finally, the delta register is updated as follows. The instantaneous content of the delta register is $\text{Delta}_{t-1}$. To this value, the calculated error vector $e_t$ is added, that is to say is subjected to a bit-by-bit XOR operation. The result:

$$\text{Delta} = \text{Delta}_{t-1} + e_t$$

is written to the delta register as a new value.

For the next PUF generation operation, in which $A_{t+}$, is produced by the PUF module, the method can be repeated. An example is used to illustrate the above:

Let A=(1 1 1 1 1 0 0 0 1 1)

$\text{Delta}_{t-1}$=(1 0 1 0 0 0 0 0 0 1)

$A_t$=(0 1 0 0 1 0 0 0 1 1) (note: $A_t$ has three errors)

$B_t = A_t + \text{Delta}_{t-1}$, is calculated:

$B_t$=(1 1 1 0 1 0 0 0 1 0) (note: $B_t$ now has only two errors)

$B_t$ is now subjected to error correction using the ECC algorithm.

The ECC outputs the error vector $e_t$:

$e_t$=(0 0 0 1 0 0 0 0 0 1)

The addition of $e_t$ and $B_t$ gives the true PUF value A:

$B_t$=(1 1 1 0 1 0 0 0 1 0)

+$e_t$=(0 0 0 1 0 0 0 0 0 1)

A=(1 1 1 1 1 0 0 0 1 1)

Finally, $\text{Delta}_t$ is calculated by adding $\text{Delta}_{t-1}$ and $e_t$:

$\text{Delta}_{t-1}$=(1 0 1 0 0 0 0 0 0 1)

+$e_t$=(0 0 0 1 0 0 0 0 0 1)

$\text{Delta}_t$=(1 0 1 1 0 0 0 0 0 0)

In general, the delta preliminary correction will be a simplification for the error correction algorithm on that basis.

However, cases are also conceivable in which the delta (preliminary) correction is counterproductive. For example let it be assumed that the times t-1 and t are far apart and totally different ambient conditions prevail at these times, typically temperatures. In that case, it is highly probable that the differences $\text{Delta}_{t-1}$ and $\text{Delta}_t$ will also no longer be similar, but will differ from one another considerably. The vector $B_t$ would then be a poorer approximation of the true PUF value A than $A_t$ itself. In such cases, it is better to suppress or omit the delta correction and to proceed in classical fashion. This means feeding the vector $A_t$ directly into the ECC error correction as in the case of the conventional procedure outlined above during the PUF reproduction.

It is therefore recommended that the delta correction mechanism is implemented not rigidly but rather such that it can possibly also be (automatically) disconnected.

In this case, the following procedure typically makes sense. An attempt is first made at the PUF reconstruction using the delta correction that is described above. Should this fail, that is to say should the ECC error correction then give a value which is subsequently identified as incorrect, then it is attempted once again without delta correction, that is to say in the conventional fashion.

The converse order is also conceivable, that is to say the conventional variant of the method is performed first and then use the delta correction described above.

FIG. 1 shows a method 100 for reconstructing a PUF A for use in an electronic device based on exemplary embodiments. The method comprises the generation of a (potentially) erroneous PUF $A_t$ in a block 110; the preliminary correction of the PUF $A_t$ by means of a stored correction vector $\text{Delta}_{t-1}$, in order to obtain a preliminarily corrected PUF $B_t$, in a block 120; and the reconstruction of the PUF A from the preliminarily corrected PUF $B_t$ by means of an error correction algorithm in a block 130.

In this case, the reconstruction of the PUF A from PUF $B_t$ by means of the error correction algorithm typically comprises the application of an ECC algorithm to the bit sequence $B_t$ in order to obtain an error vector $e_t$ as the result. Next, $B_t$ and $e_t$ are XORed. This produces a precursor for the new correction vector Delta. The stored correction vector $\text{Delta}_{t-1}$, and the error vector $e_t$ are XORed in order to calculate the new or updated correction vector $\text{Delta}_t$. $\text{Delta}_t$ is then stored as a new correction vector in an error register 230, the new correction vector in turn being used as an error vector during later fresh PUF reconstruction, as already described. It thus takes on the role of the earlier $\text{Delta}_{t-1}$. The preliminarily corrected PUF $B_t$ and the redundancy value R are fed into the ECC algorithm as input values. The latter is described in detail further above and will not be discussed in further detail at this juncture.

Figure 2:
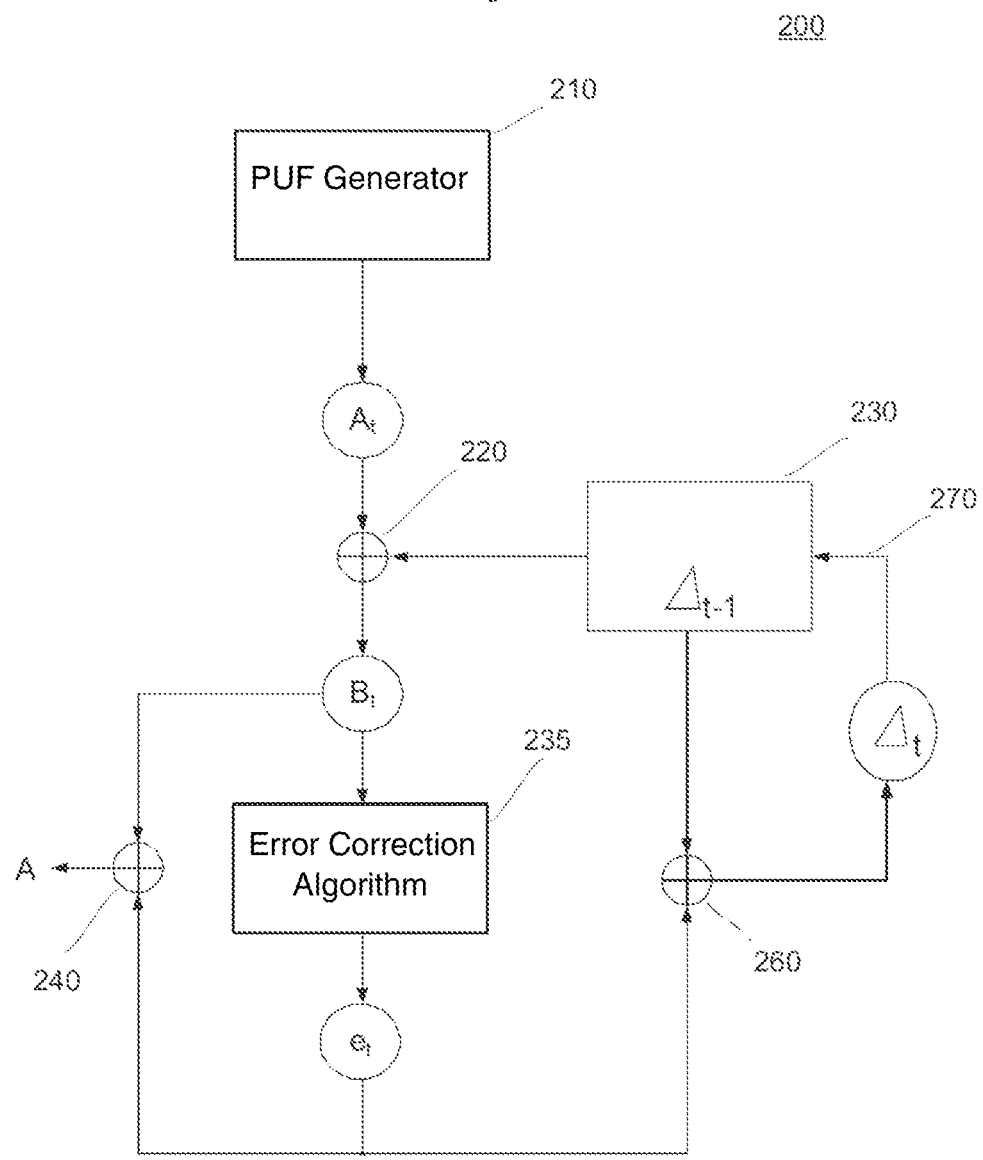
FIG. 2 shows a schematic illustration of an apparatus based on embodiments of the invention.

FIG. 2 schematically shows a flowchart for a method 200 based on exemplary embodiments. In block 210, a potentially erroneous PUF $A_t$ is generated. This is XORed with the correction vector $\text{Delta}_{t-1}$, stored in memory 230 in block 220. The result is the preliminarily corrected bit sequence $B_t$. This is then subjected to an error correction algorithm, typically an ECC algorithm, in step 235. This results in the error vector $e_t$. This is logically combined with the preliminarily corrected bit sequence $B_t$ by means of an XOR function in step 240, which results in the true PUF A. The error vector $e_t$ is also XORed with the correction vector $\text{Delta}_{t-1}$, already used previously by means of an XOR function in block 260 in order to obtain a new or current (preliminary) correction vector $\text{Delta}_t$. This is written to the memory 230 as a new correction vector $\text{Delta}_t$, block 270, in order to be available for the next PUF reconstruction cycle.

In this case, the length of $A_t$ is typically from approximately 64 bits to 6000 bits. The average bit error rate of $A_t$ may be from approximately 0.3% to approximately 25% in this case, for example 1%, 3%, 5%, 10%, 15% or 20%. The length of the reconstructed true PUF A is typically from approximately 64 bits to approximately 6000 bits.

Typically, the method for PUF reconstruction based on exemplary embodiments is implemented on the electronics of a chip card. In this case, the erroneous PUF $A_t$ is typically generated by a transistor-based method. The error vector $\text{Delta}_t$ is usually stored on a read only memory, for example an EEPROM.

As already mentioned, under adverse ambient conditions, for example when there is a large temperature difference in the electronics in comparison with the last PUF reconstruction, the delta correction method based on exemplary embodiments can also have an adverse influence on the reconstruction, so that in the worst case there is no possibility at all of correct reconstruction. Therefore, exemplary embodiments can involve a standard test to determine whether the PUF A has been reconstructed correctly. In the event of an incorrectly reconstructed PUF A, the reconstruction may then possibly be performed afresh without correcting the PUF $A_t$ by means of the stored correction vector $Delta_{t-1}$.

For this purpose, the ECC algorithm applied to $B_t$ may be provided in different strengths, for example, so that in the standard case (with delta preliminary correction) a weak correction algorithm is used. If this method fails in exceptional cases as described above, it is possible to dispense with the correction and to apply a stronger correction algorithm.

In exemplary embodiments, the length of the correction vector Delta is identical to the length of the PUF value A. In practical application, A can be broken down into single segments of the same length. Accordingly, Delta can also be broken down into an identical plurality of single segments of the same length. By way of example, a 1000-bit PUF can be broken down into 25 segments of 40 bits each, as can the Delta of the same length. In this case, a smaller error correction algorithm (which operates on smaller code word lengths) can be applied, since only the errors in the relevant single segment are ever corrected, and not all the errors in the entire bit sequence simultaneously.

Usually, a cryptographic key is generated from the PUF A reconstructed using the method based on exemplary embodiments. This cryptographic key can then be used for encryption with blocking encryption or stream encryption, typically AES or Triple-DES.

Figure 3:
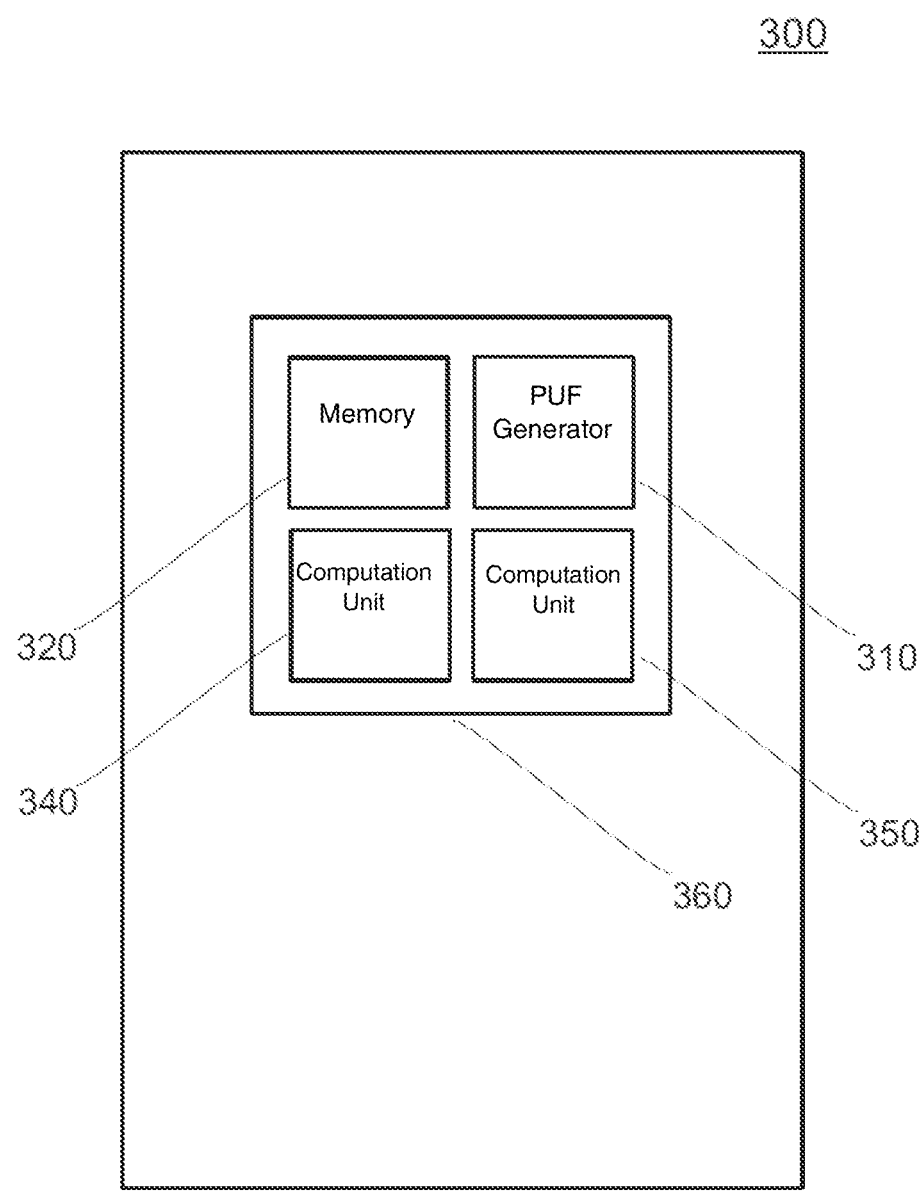
FIG. 3 schematically shows an apparatus based on embodiments of the invention.

FIG. 3 schematically shows an apparatus 300 based on exemplary embodiments which are designed to perform a method based on exemplary embodiments. By way of example, it may be a chip card or a cryptography module which is embedded in a terminal, for example a mobile terminal, such as a mobile telephone or an RFID device.

The apparatus comprises an element 310 for generating a potentially erroneous PUF $A_t$, a memory 320 for storing a correction vector $Delta_{t-1}$, and a computation unit 340 for performing an error correction algorithm. A further computation unit 350 is used to perform the XOR operations described and all other operations—some of which are not described here in detail—which are known to a person skilled in the art. In exemplary embodiments, the two computation units or all of the parts of the apparatus 300 may be of integrated design, for example on an integrated circuit 360. This may also comprise further parts, e.g. the logic for reconstructing the cryptographic key and other typical parts of a chip card or of a cryptography module, as known to a person skilled in the art.

A person skilled in the art will readily understand that the methods and apparatuses described here can also be used for purposes other than those described here and that they can be used in a wide variety of electronic devices in which a PUF needs to be reconstructed. In addition, the key lengths and lengths of the bit sequences which are indicated herein can be modified using methods that are part of the standard knowledge of a person skilled in the art for cases other than those specifically described herein.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method for reconstructing a physically uncloneable function (PUF) A for use in an electronic device, the method comprising:
    generating a potentially erroneous PUF $A_t$;
    performing a preliminary correction of the potentially erroneous PUF $A_t$ by means of a stored correction vector $Delta_{t-1}$, to obtain a preliminarily corrected PUF $B_t$;
    reconstructing the PUF A from the preliminarily corrected PUF $B_t$ by means of an error correction algorithm;
    testing to determine whether the PUF A has been reconstructed correctly; and
    re-performing the reconstruction of the PUF A without performing a preliminary correction of the potentially erroneous PUF $A_t$ if the testing determines the PUF A was incorrectly reconstructed.

2. The method as claimed in claim 1, wherein reconstructing the PUF A from the preliminarily corrected PUF $B_t$ by means of an error correction algorithm comprises:
    applying the error correction algorithm to the preliminarily corrected PUF $B_t$ to obtain an error vector $e_t$; and
    XORing the preliminarily corrected PUF $B_t$ and the error vector $e_t$.

3. The method as claimed in claim 2, wherein the error correction algorithm is an ECC algorithm.

4. The method as claimed in claim 2, wherein a current correction vector $Delta_t$ is calculated by XORing the stored correction vector $Delta_{t-1}$ and the error vector $e_t$.

5. The method as claimed in claim 4, further comprising storing the current correction vector $Delta_t$ as a new correction vector in an error register, the new correction vector being used as the correction vector $Delta_{t-1}$ during a subsequent PUF reconstruction.

6. The method as claimed in claim 1, wherein the length of the potentially erroneous PUF $A_t$ is in a range from 64 bits to 6000 bits.

7. The method as claimed in claim 1, wherein an average bit error rate of the potentially erroneous PUF $A_t$ is in a range from 0.3% to 25%.

8. The method as claimed in claim 1, wherein the length of the PUF A is in a range from 64 bits to 6000 bits.

9. The method as claimed in claim 1, wherein the potentially erroneous PUF $A_t$ is generated by a transistor-based method.

10. The method as claimed in claim 1, wherein the correction vector $Delta_{t-1}$ is stored in a nonvolatile read only memory.

11. The method as claimed in claim 1, wherein the length of the correction vector $Delta_{t-1}$ is in a range from 64 bits to 6000 bits.

12. The method as claimed in claim 1, further comprising producing a cryptographic key from the PUF A.

13. The method as claimed in claim 12, further comprising using the cryptographic key for encryption with block encryption or stream encryption.

14. The method as claimed in claim 1, wherein the potentially erroneous PUF $A_t$ and the correction vector $Delta_{t-1}$ are processed on a segment-by-segment basis in segments of equal length.

15. An apparatus for reconstructing a physically uncloneable function (PUF) A, comprising:
- an element configured to generate a potentially erroneous PUF $A_t$;
- a memory configured to store a correction vector $Delta_{t-1}$;
- a first computation unit configured to perform a preliminary correction of the PUF $A_t$ by means of a stored correction vector $Delta_{t-1}$, to obtain a preliminarily corrected PUF $B_t$; and a second computation unit configured to reconstruct the PUF A from the preliminarily corrected PUF $B_t$ by means of an error correction algorithm, test to determine whether the PUF A has been reconstructed correctly, and re-perform the reconstruction of the PUF A without performing a preliminary correction of the potentially erroneous PUF $A_t$ if the testing determines the PUF A was incorrectly reconstructed.

16. The apparatus as claimed in claim 15, wherein the second computation unit is configured to reconstruct the PUF A from the preliminarily corrected PUF $B_t$ by applying the error correction algorithm to the preliminarily corrected PUF $B_t$ to obtain an error vector $e_t$, and XORing the preliminarily corrected PUF $B_t$ and the error vector $e_t$.

17. The apparatus as claimed in claim 15, wherein the first and second computation units are part of the same integrated circuit.

18. The apparatus as claimed in claim 15, wherein the apparatus is a chip card or an RFID device.

* * * * *